(12) United States Patent
Takeda

(10) Patent No.: US 10,490,818 B2
(45) Date of Patent: Nov. 26, 2019

(54) NEGATIVE ELECTRODE FOR LITHIUM ION SECONDARY BATTERY, AND LITHIUM ION SECONDARY BATTERY

(71) Applicant: NEC ENERGY DEVICES, LTD., Sagamihara-shi, Kanagawa (JP)

(72) Inventor: Kouzou Takeda, Sagamihara (JP)

(73) Assignee: Envision AESC Energy Devices Ltd., Sagamihara-shi, Kanagawa (JP)

( * ) Notice: Subject to any disclaimer, the term of this patent is extended or adjusted under 35 U.S.C. 154(b) by 228 days.

(21) Appl. No.: 15/541,388

(22) PCT Filed: Jan. 20, 2016

(86) PCT No.: PCT/JP2016/051509
§ 371 (c)(1),
(2) Date: Jul. 3, 2017

(87) PCT Pub. No.: WO2016/121585
PCT Pub. Date: Aug. 4, 2016

(65) Prior Publication Data
US 2017/0373314 A1      Dec. 28, 2017

(30) Foreign Application Priority Data
Jan. 29, 2015  (JP) .................... 2015-015519

(51) Int. Cl.
*H01M 4/02*    (2006.01)
*H01M 4/583*   (2010.01)
(Continued)

(52) U.S. Cl.
CPC .......... *H01M 4/583* (2013.01); *H01M 4/587* (2013.01); *H01M 4/621* (2013.01); *H01M 4/625* (2013.01);
(Continued)

(58) Field of Classification Search
CPC ....................................................... H01M 4/02
See application file for complete search history.

(56) References Cited

U.S. PATENT DOCUMENTS

| | | |
|---|---|---|
| 2005/0132562 A1 | 6/2005 | Saito et al. |
| 2013/0164618 A1 | 6/2013 | Konishi |
| 2014/0134492 A1 | 5/2014 | Yamami et al. |

FOREIGN PATENT DOCUMENTS

| | | |
|---|---|---|
| EP | 2879216 A1 | 6/2015 |
| JP | 2004-134304 A | 4/2004 |

(Continued)

OTHER PUBLICATIONS

International Search Report of PCT/JP2016/051509, dated Apr. 19, 2016 [PCT210].
(Continued)

*Primary Examiner* — Jacob B Marks
(74) *Attorney, Agent, or Firm* — Sughrue Mion, PLLC

(57) ABSTRACT

A negative electrode for a lithium ion secondary battery, the negative electrode including a negative electrode active material, a fine graphite material, a conductive aid, and a binder, wherein the mass ratio of the fine graphite material to the conductive aid is in the range from 1 to 10, and the average particle diameter (median diameter $D_{50}$) of the fine graphite material is smaller than the average particle diameter of the negative electrode active material, and in the range of 1 to 15 μm.

20 Claims, 2 Drawing Sheets

(51) Int. Cl.
H01M 10/0525 (2010.01)
H01M 4/587 (2010.01)
H01M 4/62 (2006.01)

(52) U.S. Cl.
CPC .. H01M 10/0525 (2013.01); H01M 2004/027 (2013.01); Y02T 10/7011 (2013.01)

(56) References Cited

FOREIGN PATENT DOCUMENTS

| | | | |
|---|---|---|---|
| JP | 2005-183287 A | | 7/2005 |
| JP | 2009-26514 A | | 2/2009 |
| JP | 2009-026514 A | | 2/2009 |
| JP | 2009-205950 A | | 9/2009 |
| JP | 2011-060467 A | | 3/2011 |
| JP | 2012-14838 A | | 1/2012 |
| JP | 2012-014838 A | | 1/2012 |
| JP | 2012-84519 A | | 4/2012 |
| JP | 2012-084519 A | | 4/2012 |
| JP | 2014-067643 | * | 4/2014 |
| JP | 2014-186955 A | | 10/2014 |
| JP | 2015-219989 A | | 12/2015 |
| JP | 2014-067643 A | | 4/2017 |
| JP | 2014-67643 A | | 4/2017 |
| WO | 2013/002162 A1 | | 1/2013 |
| WO | 2013/008524 A1 | | 1/2013 |
| WO | 2013/098625 A1 | | 7/2013 |
| WO | 2013/098962 A1 | | 7/2013 |
| WO | 2013/114094 A1 | | 8/2013 |
| WO | 2013/114095 A1 | | 8/2013 |
| WO | 2015/152092 A1 | | 10/2015 |

OTHER PUBLICATIONS

Written Opinion of PCT/JP2016/051509, dated Apr. 19, 2016 [PCT237].
Communication dated Jul. 6, 2018, from the European Patent Office in counterpart European Application No. 16743189.9.
Notice of Reasons for Refusal dated Aug. 27, 2019 issued by the Japanese Patent Office in counterpart application No. 2016-571966.

* cited by examiner (a)

(b)

NEGATIVE ELECTRODE FOR LITHIUM ION SECONDARY BATTERY, AND LITHIUM ION SECONDARY BATTERY

CROSS REFERENCE TO RELATED APPLICATIONS

This application is a National Stage of International Application No. PCT/JP2016/051509 filed Jan. 20, 2016, claiming priority based on Japanese Patent Application No. 2015-015519 filed Jan. 29, 2015, the contents of all of which are incorporated herein by reference in their entirety.

TECHNICAL FIELD

The present invention relates to a negative electrode for a lithium ion secondary battery, and a lithium ion secondary battery.

BACKGROUND ART

Lithium ion secondary batteries have high energy density and excellent charge/discharge cycle characteristics, and are thus widely used for a power supply for compact mobile devices such as cellular phones and laptop computers. In addition, the recent increasing environmental considerations and growing consciousness of energy saving have been promoting a demand for large batteries having a large capacity and a long life in the fields of electric vehicles, hybrid electric vehicles, power storage, etc.

In general, a lithium ion secondary battery primarily consists of: a negative electrode including a negative electrode active material of a carbon material capable of intercalating and deintercalating a lithium ion; a positive electrode including a positive electrode active material of a lithium composite oxide capable of intercalating and deintercalating a lithium ion; a separator separating the negative electrode and the positive electrode; and a non-aqueous electrolytic solution prepared by dissolving a lithium salt in a non-aqueous solvent.

Amorphous carbon or graphite is used for the carbon material used as the negative electrode active material, and graphite is typically used particularly in an application which requires a high energy density.

For example, Patent Literature 1 describes a carbon material for a negative electrode for a non-aqueous electrolyte secondary battery, the carbon material including a mixture of an artificial graphite particle and a natural graphite particle at 50:50 to 80:20 (mass ratio), wherein the artificial graphite particle has an interplanar spacing for the (002) plane, $d_{002}$, of 0.3354 to 0.3360 nm in the X-ray diffraction pattern, and an average aspect ratio of 1 to 5; the natural graphite particle has an interplanar spacing for the (002) plane, $d_{002}$, of 0.3354 to 0.3357 nm in the X-ray diffraction pattern, a median diameter ($D_{50}$) of 10 to 25 µm, and relations among the $D_{50}$, the diameter at 10 cumulative % ($D_{10}$), and the diameter at 90 cumulative % ($D_{90}$), specifically, $D_{90}/D_{50}$ and $D_{50}/D_{10}$ are each 1.6 or smaller. The literature states that an object of the invention is to provide a non-aqueous electrolyte secondary battery excellent in charging/loading characteristics in a low-temperature environment by using such a carbon material.

Patent Literature 2 describes a negative electrode for a non-aqueous electrolyte secondary battery, the negative electrode including a first carbon capable of electrochemically intercalating and deintercalating a lithium ion; and a second carbon capable of electrochemically intercalating and deintercalating a lithium ion or substantially incapable of intercalating a lithium ion, wherein an aggregate of the second carbon particle is primarily localized in an empty space among a plurality of particles of the first carbon, and the average particle diameter of the second carbon is 15% or less of the average particle diameter of the first carbon. The literature states that an object of the invention is to provide a non-aqueous electrolyte secondary battery with such a negative electrode in which the peeling of a mixture layer caused by charge/discharge cycles can be prevented and which provides a high capacity.

Patent Literature 3 describes a negative electrode material for a non-aqueous electrolytic solution secondary battery, the negative electrode material including a graphite particle (A) and a carbon material (B), wherein the graphite particle (A) has an interplanar spacing for the 002 plane (d002) of 3.37 Å (0.337 nm) or smaller as measured with a wide angle X-ray diffraction method, and an average roundness of 0.9 or higher; the carbon material (B) has an interplanar spacing for the 002 plane (d002) of 3.37 Å (0.337 nm) or smaller, a Raman R value (peak strength around 1360 $cm^{-1}$/peak strength around 1580 $cm^{-1}$) of 0.18 to 0.7 in the Raman spectrum with an argon ion laser, an aspect ratio of 4 or larger, and an average particle diameter (d50) of 2 to 12 µm; and the mass fraction of the carbon material (B) to the total amount of the graphite particle (A) and the carbon material (B) is 0.5 to 15% by mass. The literature states that a non-aqueous electrolytic solution secondary battery with such a negative electrode material exhibits low irreversible capacity and excellent properties in terms of charge/discharge efficiency.

CITATION LIST

Patent Literature

Patent Literature 1: JP2009-026514A
Patent Literature 2: JP2012-014838A
Patent Literature 3: JP2012-084519A

SUMMARY OF INVENTION

Technical Problem

However, lithium ion secondary batteries with a graphite-based negative electrode active material are required to be further improved in cycle characteristics.

An object of the present invention is to provide a lithium ion secondary battery with improved cycle characteristics, and a negative electrode suitable therefore.

Solution to Problem

According to one aspect of the present invention is provided a negative electrode for a lithium ion secondary battery, the negative electrode including a negative electrode active material, a fine graphite material, a conductive aid, and a binder, wherein a mass ratio of the fine graphite material to the conductive aid is in the range from 1 to 10, and the average particle diameter (median diameter $D_{50}$) of the fine graphite material is smaller than the average particle diameter (median diameter $D_{50}$) of the negative electrode active material, and in the range of 1 to 15 µm.

According to another aspect of the present invention is provided a negative electrode for a lithium ion secondary battery, the negative electrode including a negative electrode active material, a fine graphite material, a conductive aid, and a binder, wherein the fine graphite material includes a particle contacting with a particle of the negative electrode active material, or a particle contacting with a particle of the conductive aid contacting with a particle of the negative electrode active material, with an electroconductive path formed between particles of the negative electrode active material via the particle of the fine graphite material, a mass ratio of the fine graphite material to the conductive aid is in the range from 1 to 10, and the average particle diameter (median diameter $D_{50}$) of the fine graphite material is smaller than the average particle diameter (median diameter $D_{50}$) of the negative electrode active material, and in the range of 1 to 15 μm.

According to another aspect of the present invention is provided a lithium ion secondary battery including a positive electrode, the above negative electrode, and a non-aqueous electrolytic solution.

Advantageous Effects of Invention

According to an exemplary embodiment, a lithium ion secondary battery with improved cycle characteristics, and a negative electrode suitable therefore can be provided.

DESCRIPTION OF EMBODIMENTS

Figure 1:
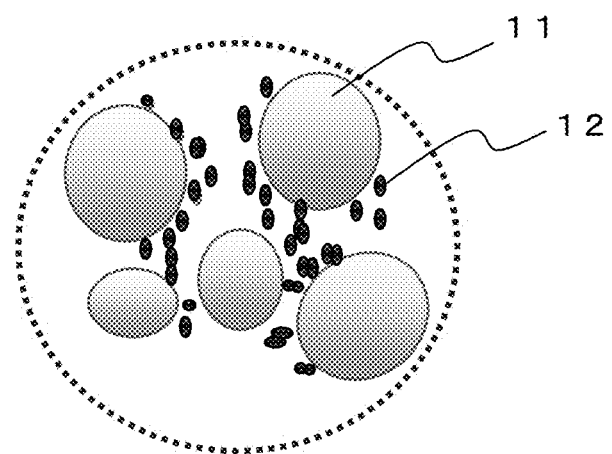
FIG. 1 is a schematic view for illustrating the distribution of particles (a state of an active material in shrinkage due to discharge) in a negative electrode according to an exemplary embodiment (FIG. 1(a): a case of a negative electrode according to a related art, FIG. 1(b): a case of a negative electrode according to an exemplary embodiment).
Figure 1:
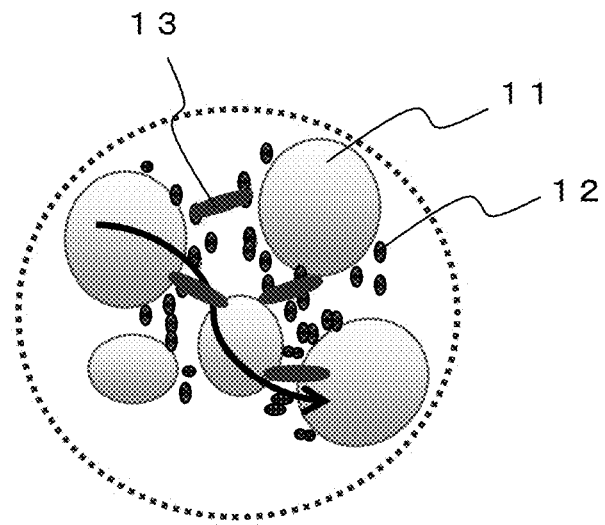

Hereinafter, an exemplary embodiment will be described.

A negative electrode according to an exemplary embodiment includes a negative electrode active material, a fine graphite material, a conductive aid, and a binder. The fine graphite material includes a particle contacting with a particle of the negative electrode active material, or a particle contacting with a particle of the conductive aid contacting with a particle of the negative electrode active material, and an electroconductive path can be formed between particles of the negative electrode active material via the particle of the fine graphite material (hereinafter, also referred to as "fine graphite particle").

The mass ratio of the fine graphite material to the conductive aid in the negative electrode is in the range from 1 to 10, and the average particle diameter (median diameter $D_{50}$) of the fine graphite material is preferably smaller than the average particle diameter (median diameter $D_{50}$) of the negative electrode active material, and in addition preferably in the range of 1 to 15 μm.

The negative electrode may include a current collector, and a negative electrode active material layer containing a negative electrode active material, a fine graphite material, a conductive aid, and a binder can be formed on the current collector.

Use of the negative electrode according to an exemplary embodiment provides a lithium ion secondary battery with improved cycle characteristics. This is presumably because addition of an appropriate amount of a fine graphite particle having an appropriate size to a particle of a negative electrode active material allows the fine graphite particle to involve in formation and retention of an electroconductive path between particles of the negative electrode active material thereby to prevent disconnection of the electroconductive path between particles of the negative electrode active material in charge/discharge cycles, and thus the electroconductive path tends to be retained.

To ensure an electroconductive path in charge/discharge cycles, a large amount of a conductive aid is correspondingly required. The amount of a conductive aid can be reduced through addition of a fine graphite material. As a result generation of gas derived from decomposition of an electrolytic solution due to a conductive aid (in particular, a conductive aid having a large specific surface area or having a functional group on the surface) can be suppressed, and in addition reduction of the peel strength and capacity due to addition of a large amount of a conductive aid can be prevented. Further, fine graphite materials have capacity, and thus can reduce lowering of the capacity due to addition. Furthermore, fine graphite materials have excellent electroconductivity, and thus can form an electroconductive path with low resistance to contribute to improvement of the cycle characteristics.

Conductive aids (in particular, conductive aids having a primary particle diameter in the order of tens of nanometers) such as carbon black and Ketjen black have high agglomerating properties. Then, it is difficult to homogeneously disperse the conductive aid in the interparticle space of the negative electrode active material, and unevenness is likely to be generated in the network of electroconductive paths. The electroconductive path formed via such a fine conductive aid particle has effective electroconductivity in early stages of cycles. As a charge/discharge cycle is repeated, however, disconnection of the electroconductive path is likely to occur in association with, for example, the volume change (swelling, shrinkage) of the negative electrode active material, and drastic increase of the resistance or lowering of the capacity may be caused. In addition, fine particles of the conductive aid may fill the interparticle gap of the negative electrode active material to disconnect the flow path for an electrolytic solution. On the other hand, fine graphite particles have a relatively large particle diameter. Thus, they are excellent in dispersibility and can reduce unevenness of the network of electroconductive paths, and in addition filling of the interparticle gap of the negative electrode active material can be prevented. As a result, disconnection of the electroconductive path or flow path for an electrolytic solution is less likely to occur in charge/discharge cycles, and thus increase of the resistance or deterioration of the capacity can be reduced.

Moreover, an SEI film is formed on each fine graphite particle constituting the electroconductive path, and the SEI film formed on the fine graphite particle is homogeneously dispersed can presumably function also as a migration path for a lithium ion to contribute to improvement of the properties.

In formation of the electroconductive path between particles of the negative electrode active material, the fine graphite particle contacting with a particle of the negative electrode active material may be directly contacting with another particle of the negative electrode active material, or may form an electroconductive path electrically connecting to another particle of the negative electrode active material via an electroconductive particle included in the negative electrode (e.g., a conductive aid particle or another fine graphite particle). For example, the fine graphite particle contacting with a particle of the negative electrode active material may be contacting with a particle (primary particle or secondary particle) of the conductive aid contacting with another particle of the negative electrode active material. The fine graphite particle contacting with a particle of the negative electrode active material may be contacting with another fine graphite particle contacting with another particle of the negative electrode active material.

In formation of the electroconductive path between particles of the negative electrode active material, the fine graphite particle contacting with a particle (primary particle or secondary particle) of the conductive aid contacting with a particle of the negative electrode active material may be directly contacting with another particle of the negative electrode active material, or may form an electroconductive path electrically connecting to another particle of the negative electrode active material via a particle of an electroconductivity material included in the negative electrode (e.g., a conductive aid particle or another fine graphite particle). For example, the fine graphite particle contacting with a particle (primary particle or secondary particle) of the conductive aid contacting with a particle of the negative electrode active material may be contacting with another particle (primary particle or secondary particle) of the conductive aid contacting with another particle of the negative electrode active material. The fine graphite particle contacting with a particle (primary particle or secondary particle) of the conductive aid contacting with a particle of the negative electrode active material may be contacting with another fine graphite particle contacting with another particle of the negative electrode active material.

FIG. 1 is a schematic view for illustrating the distribution state of particles in the negative electrode in discharging (in shrinkage of the active material) after repeating charge/discharge cycles. FIG. 1(a) shows the case without the fine graphite material, and FIG. 1(b) shows the case with the fine graphite material. In the figures, the reference sign 11 indicates a negative electrode active material particle, the reference sign 12 indicates a conductive aid particle, and the reference sign 13 indicates a fine graphite particle. In FIG. 1(a), the electroconductive path is disconnected through the shrinkage of the active material in discharging after charge/discharge cycles. In contrast, FIG. 1(b) shows an electroconductive path retained along the arrow via the fine graphite particles 13. The fine graphite particle, which is directly contacting with the negative electrode active material particle in the figures, may be contacting with a conductive aid particle contacting with a negative electrode active material particle, or a secondary particle thereof.

Now, the negative electrode and lithium ion secondary battery according to an exemplary embodiment will be described in more detail.

(Negative Electrode Active Material)

The negative electrode active material is not limited if it is an active material for a negative electrode capable of intercalating and deintercalating a lithium ion, but a carbon-based active material such as graphite material and amorphous carbon (e.g., graphitizable carbon, non-graphitizable carbon) can be suitably used. A substance commonly used for a negative electrode active material in a lithium ion secondary battery may be used for the carbon-based active material in preparation. Natural graphite or artificial graphite can be used for the graphite material, and natural graphite, which is inexpensive, is preferred in view of material cost. Examples of the amorphous carbon include amorphous carbons derived by heat treatment of coal pitch coke, petroleum pitch coke, or acetylene pitch coke.

In the case that a graphite material, in particular, natural graphite is used for the negative electrode active material, the graphite material may be covered with amorphous carbon. The surface of a particle of a graphite material can be covered with amorphous carbon by using a conventional method. Examples of the method which can be used include a method in which an organic substance such as tar pitch is attached to the surface of a particle and heat-treated; and a film-forming method such as a chemical vapor deposition method (CVD method) with an organic substance such as a condensed hydrocarbon of benzene, xylene or the like, sputtering method (e.g., ion beam sputtering method), a vacuum deposition method, a plasma method, and an ion plating method. Amorphous carbon covering a particle of a graphite material can inhibit the side reaction between the particle of a graphite material and the electrolytic solution to enhance the charge/discharge efficiency and increase the reaction capacity, and in addition allows the particle of a graphite material to have a higher hardness.

The average particle diameter of the negative electrode active material is preferably in the range of 2 to 40 μm, more preferably in the range of 5 to 30 μm, and even more preferably in the range of 10 to 30 μm in view of the charge/discharge efficiency, input/output characteristics, or the like. Here, an average particle diameter refers to a particle diameter at an integrated value up to 50% (median diameter: $D_{50}$) in a particle size distribution (volume-based) obtained by using a laser diffraction/scattering method.

The specific surface area (a BET specific surface area measured at 77 K in accordance with a nitrogen adsorption method) of the negative electrode active material is preferably in the range of 0.3 to 10 $m^2/g$, more preferably in the range of 0.5 to 10 $m^2/g$, and even more preferably in the range of 0.5 to 7.0 $m^2/g$ in view of the charge/discharge efficiency and input/output characteristics.

The ratio of the particle diameter at 90 cumulative % in the cumulative distribution ($D_{90}$) to the median diameter ($D_{50}$), $D_{90}/D_{50}$, of the negative electrode active material is preferably 1.5 or smaller, and more preferably 1.3 or smaller. The negative electrode active material having a sharp particle diameter distribution allows formation of a homogeneous negative electrode, and provides a resulting secondary battery with improved charge/discharge characteristics.

Here, a particle diameter $D_{90}$ refers to a particle diameter at an integrated value up to 90% in a particle size distribution (volume-based) obtained by using a laser diffraction/scattering method, and a median diameter $D_{50}$ refers to a particle diameter at an integrated value up to 50% in a particle size distribution (volume-based) obtained by using a laser diffraction/scattering method.

The particle of the negative electrode active material is preferably a spheroidized (non-scale-shaped) particle, and the average particle roundness is preferably in the range of 0.6 to 1, more preferably in the range of 0.86 to 1, even more preferably in the range of 0.90 to 1, and particularly preferably in the range of 0.93 to 1. Spheroidization may be performed by using a conventional method. Such a negative electrode active material particle is preferably a spheroidized natural graphite particle in view of high-capacity implementation in combination with cost reduction for raw materials, and a commonly available spheroidized natural graphite material may be used.

The particle roundness is given as follows: a particle image is projected on a plane; and when designating the periphery length of a corresponding circle having the same area as the projected particle image as 1 and designating the periphery length of the projected particle image as L, the ratio 1/L is defined as the particle roundness.

An average particle roundness can be measured with a commercially available electron microscope (e.g., a scanning electron microscope manufactured by Hitachi, Ltd., trade name: S-2500) as follows. First, an image of a particle (powder) is observed with the electron microscope at a magnification of 1000× and projected on a plane, and the periphery length of the projected image, L, is determined; the periphery length of a corresponding circle having the same area as the projected image of the particle observed, 1, is then determined; the ratio of the periphery length 1 to the periphery length of the projected image of the particle, L, i.e., 1/L, is calculated for arbitrarily selected 50 particles; and the average value is used as the average particle roundness. Alternatively, this measurement can be performed with a flow-type particle image analyzer. For example, almost the same value is obtained even when the particle roundness is measured with a powder measurement apparatus available from Hosokawa Micron Corporation (trade name: FPIA-1000).

The configuration in which the negative electrode active material has high roundness promotes formation of an interparticle void of the negative electrode active material, and as a result the fine graphite material tends to be disposed in a homogeneously dispersed manner, which leads to contribution to improvement of the cycle characteristics. In addition, formation of an interparticle void facilitates flowing of the electrolytic solution, and thus can contribute to improvement of the output characteristics. In the case that natural graphite, which has a higher tendency to take on a specific orientation through pressing in preparation of an electrode than artificial graphite, is used for the negative electrode active material, the natural graphite takes on a random orientation through spheroidization, and thus can contribute to improvement of the output characteristics.

The negative electrode active material, the fine graphite material, and the conductive aid may be mixed together by using a known mixing method. An additional active material may be mixed therein, as necessary, within a range which does not impair a desired effect.

In the case that the graphite material is used for the negative electrode active material, the content of the graphite material based on the total amount of the negative electrode active material (excluding the fine graphite material) is preferably 90% by mass or more, and more preferably 95% by mass or more. The negative electrode active material may be composed only of the graphite material.

(Fine Graphite Material)

For the fine graphite material, a graphite material such as artificial graphite and natural graphite may be used. A substance commonly used for a negative electrode active material in a lithium ion secondary battery may be used for the graphite material in preparation.

The fine graphite material is preferably artificial graphite in view that artificial graphite contains fewer impurities while having an appropriate degree of graphitization and also has a low electrical resistance, which is advantageous for improving battery performance such as cycle characteristics. Normal artificial graphite commonly available may be applied.

The physical properties of artificial graphite depend on the type of a raw material, and the calcination temperature, the type of a gas for the atmosphere, and the pressure in production, and a desired fine graphite material can be obtained through adjustment of these production conditions. Examples thereof include an artificial graphite obtained by heat-treating a graphitizable carbon such as coke (e.g., petroleum coke, coal coke) and pitch (e.g., coal pitch, petroleum pitch, coal tar pitch) for graphitization at a temperature of 2000 to 3000° C., preferably at a high temperature of 2500° C. or higher; an artificial graphite obtained by graphitizing two or more graphitizable carbons.

Alternatively, a material covered with amorphous carbon may be used, the material prepared through pyrolyzing a hydrocarbon such as benzene and xylene and allowing it to deposit on the surface of a base material containing natural graphite or artificial graphite by using a CVD method (chemical vapor deposition method).

The mass ratio of the fine graphite material to the conductive aid may be set in the range from 1 to 10. In view of obtaining a sufficient effect of addition, the mass ratio of the fine graphite material to the conductive aid is preferably 1 or more, more preferably 1.5 or more, and even more preferably 2 or more. In view of prevention of generation of gas or prevention of reduction of the peel strength, the mass ratio is preferably 10 or less, more preferably 8 or less, and even more preferably 7 or less.

The content of the fine graphite material based on the negative electrode active material is preferably in the range of 0.1 to 6.0% by mass. In view of obtaining a sufficient effect of addition, the content of the fine graphite material based on the negative electrode active material is preferably 0.1% by mass or more, more preferably 0.3% by mass or more, and even more preferably 0.6% by mass or more. In view of prevention of generation of gas or prevention of reduction of the peel strength, the content is preferably 6.0% by mass or less, more preferably 4.0% by mass or less, and even more preferably 3.0% by mass or less. "The content of the fine graphite material based on the negative electrode active material" (% by mass) can be determined from 100×A/B, where A denotes the mass of the fine graphite material, and B denotes the mass of the negative electrode active material.

The average particle diameter (median diameter $D_{50}$) of the fine graphite material is preferably smaller than the average particle diameter (median diameter $D_{50}$) of the negative electrode active material, and more preferably in the range of 1 to 15 μm.

The configuration in which the fine graphite material has a moderately small median particle diameter provides an increased number of particles per unit weight, and therefore a larger number of contact points are formed even with a small amount of addition, which provides an advantageous effect for formation of an electroconductive path. In addition, the configuration in which the particle of the fine graphite material is smaller than the particle of the negative electrode active material facilitates disposition of the particle of the fine graphite material in the interparticle space or empty space of the negative electrode active material, which provides an advantageous effect for formation of an electroconductive path. Further, the influence on the peel strength can be reduced.

From such viewpoints, the average particle diameter ($D_{50}$) of the fine graphite material is preferably 15 μm or smaller, and more preferably 10 μm or smaller. The average particle diameter ($D_{50}$) of the fine graphite material is preferably smaller than the average particle diameter ($D_{50}$) of the negative electrode active material, and more preferably the ratio of the average particle diameter ($D_{50}$) of the fine graphite material, Db, to the average particle diameter ($D_{50}$) of the negative electrode active material, Da, Db/Da, is 0.7 or smaller, and even more preferably 0.67 or smaller.

If the particle diameter of the fine graphite material is excessively small, on the other hand, the specific surface area is larger to easily result in generation of gas derived from decomposition of the electrolytic solution, and also the electroconductive path is likely to be disconnected in charge/discharge cycles. For these reason, the average particle diameter ($D_{50}$) of the fine graphite material is preferably 1 μm or larger, and more preferably 4 μm or larger, and the BET specific surface area (acquired in measurement at 77 K in accordance with a nitrogen adsorption method) of the fine graphite material is preferably 45 m²/g or smaller, and more preferably 20 m²/g or smaller, and the Db/Da is preferably 0.2 or larger, and more preferably 0.3 or larger. In view of sufficient formation of contact points, the BET specific surface area of the fine graphite material is preferably larger than 1 m²/g, and more preferably 4 m²/g or larger.

In the case that the conductive aid is particulate, the particle diameter of the fine graphite material is preferably larger than the particle diameter of the conductive aid. In the case the conductive aid is fibrous, the particle diameter of the fine graphite material is preferably larger than the average diameter of the conductive aid. The presence of the fine graphite material having a relatively large size allows retention of the electroconductive path, even in a situation that the electroconductive path formed by the fine conductive aid is disconnected since the negative electrode active material shrinks in discharging, and the shrinkage enlarges the interparticle gap of the negative electrode active material as a result of charge/discharge cycles.

The ratio of the particle diameter at 90 cumulative % in the cumulative distribution ($D_{90}$) to the average particle diameter ($D_{50}$), $D_{90}/D_{50}$, of the fine graphite material is preferably larger than 1.5, and more preferably 1.65 or larger. Addition of the fine graphite material having a relatively small particle diameter and broad particle size distribution to the negative electrode active material having a relatively sharp particle size distribution can improve the packing factor, and provide a mixture having a high density.

Here, $D_{90}$ refers to a particle diameter at an integrated value up to 90% in a particle size distribution (volume-based) obtained by using a laser diffraction/scattering method, and $D_{50}$ refers to a particle diameter at an integrated value up to 50% (median diameter) in a particle size distribution (volume-based) obtained by using a laser diffraction/scattering method.

The particle of the fine graphite material preferably has an average particle roundness lower than that of the particle of the negative electrode active material, and the average particle roundness is preferably lower than 0.86, more preferably 0.85 or lower, and even more preferably 0.80 or lower. For example, a graphite particle having an average particle roundness of 0.5 or higher and lower than 0.86, or a graphite particle having an average particle roundness in the range of 0.6 to 0.85 may be used. For example, a scale-shaped particle can be suitably used.

Use of a spheroidized particle (non-scale-shaped particle) for the particle of the negative electrode active material and a particle having a roundness lower than that of the negative electrode active material particle (e.g., a scale-shaped particle) for the particle of the fine graphite material (preferably, with the mixing ratio, particle size distribution, or the like controlled as described above) allows the fine graphite particle to fill the interparticle space of the negative electrode active material in a homogeneously dispersed manner, and the negative electrode active material particle and the fine graphite particle can be packed in a high density. As a result, an adequate number of contact points between particles are formed while the electrolytic solution sufficiently permeates to prevent the electroconductive path from being disconnected, and thus the increase of resistance in cycles is suppressed and the capacity is less likely to be reduced.

(Conductive Aid)

For the conductive aid, a carbon material commonly used as a conductive aid for a lithium ion secondary battery may be used, and examples thereof include electroconductive amorphous carbons such as Ketjen black, acetylene black, and carbon black; and electroconductive nanocarbon materials such as carbon nanofibers and carbon nanotubes. For the conductive aid, an amorphous carbon having a high electroconductivity and a low degree of graphitization (e.g., amorphous carbon with an R value, $I_D/I_G$, of 0.18 or higher and 0.7 or lower) can be used. $I_D$ is the peak strength of a D band around 1300 to 1400 cm$^{-1}$ in a Raman spectrum, and $I_G$ is the peak strength of a G band around 1500 to 1600 cm$^{-1}$ in a Raman spectrum.

The content of the conductive aid based on the negative electrode active material is preferably in the range of 0.1 to 3.0% by mass. The content of the conductive aid based on the negative electrode active material is preferably 0.1% by mass or more, more preferably 0.2% by mass or more, and even more preferably 0.3% by mass or more in view of sufficient formation of an electroconductive path, and the content is preferably 3.0% by mass or less, more preferably 1.5% by mass or less, and even more preferably 1.0% by mass or less in view of prevention of generation of gas derived from decomposition of the electrolytic solution due to excessive addition of the conductive aid, or prevention of reduction of the peel strength or lowering of the capacity. "The content of the conductive aid based on the negative electrode active material" (% by mass) can be determined from 100×A/B, where A denotes the mass of the conductive aid, and B denotes the mass of the negative electrode active material.

The average particle diameter (primary particle diameter) of the conductive aid is preferably in the range of 10 to 100 nm. The average particle diameter (primary particle diameter) of the conductive aid is preferably 10 nm or larger, and more preferably 30 nm or larger in view of preventing the conductive aid from excessively aggregating and homogeneously dispersing the conductive aid in the negative electrode, and the average particle diameter is preferably 100 nm or smaller, and more preferably 80 nm or smaller in view of allowing formation of a sufficient number of contact points and forming a satisfactory electroconductive path. In the case that the conductive aid is fibrous, examples of such conductive aids include a fibrous conductive aid having an average diameter of 2 to 200 nm and an average fiber length of 0.1 to 20 μm.

Here, the average diameter of the conductive aid is a median diameter ($D_{50}$), i.e., a particle diameter at an integrated value up to 50% in a particle size distribution (volume-based) obtained by using a laser diffraction/scattering method.

(Method for Fabricating Negative Electrode)

For the negative electrode for a lithium ion secondary battery according to an exemplary embodiment, for example, a negative electrode can be used in which a negative electrode active material layer including the above-described negative electrode active material, fine graphite material, and conductive aid, and further including a binder is provided on a negative electrode current collector.

The negative electrode may be formed by using a common slurry application method. For example, a slurry containing a negative electrode active material, a fine graphite material, a binder, and a solvent is prepared, and the slurry is applied on a negative current collector, dried, and pressurized, as necessary, to obtain a negative electrode in which a negative electrode active material layer is provided on the negative current collector. Examples of the method for applying a negative electrode slurry include a doctor blade method, die coater method, and a dip coating method. Alternatively, a negative electrode can be obtained by forming a thin film of aluminum, nickel, or an alloy of them as a current collector on a negative electrode active material layer which has been formed in advance, in accordance with a vapor deposition method, a sputtering method, or the like.

The binder for a negative electrode is not limited, and examples thereof include polyvinylidene fluoride (PVdF), vinylidene fluoride-hexafluoropropylene copolymers, vinylidene fluoride-tetrafluoroethylene copolymers, styrene-butadiene copolymer rubbers, polytetrafluoroethylene, polypropylene, polyethylene, polyimide, polyamideimide, methyl (meth)acrylate, ethyl (meth)acrylate, butyl (meth) acrylate, (meth)acrylonitrile, isoprene rubbers, butadiene rubbers, and fluororubbers. For the slurry solvent, N-methyl-2-pyrrolidone (NMP) or water may be used. In the case that water is used for the solvent, a thickener may be further used, such as carboxymethylcellulose, methylcellulose, hydroxymethylcellulose, ethylcellulose, and polyvinyl alcohol.

The content of the binder for a negative electrode is preferably in the range of 0.5 to 30% by mass, more preferably in the range of 0.5 to 25% by mass, and even more preferably in the range of 1 to 20% by mass based on the negative electrode active material, in view of binding strength and energy density, which are in a trade-off relation.

The negative current collector is not limited, but preferably copper, nickel, stainless steel, molybdenum, tungsten, tantalum, or an alloy containing two or more of them from the viewpoint of electrochemical stability. Examples of the shape include a foil, a plate, and a mesh.

(Lithium Ion Secondary Battery)

The lithium ion secondary battery according to an exemplary embodiment includes the above negative electrode, a positive electrode, and an electrolyte.

To fabricate the positive electrode, for example, a slurry containing a positive electrode active material, a binder, and a solvent (and a conductive aid, as necessary) is prepared, and the slurry is applied on a positive electrode current collector, dried, and pressurized, as necessary, to form a positive electrode active material layer on the positive electrode current collector. For the slurry solvent used in fabricating the positive electrode, N-methyl-2-pyrrolidone (NMP) may be used.

The positive electrode active material is not limited, and for example, a lithium composite oxide having a layered rock salt-type structure or a spinel-type structure, or lithium iron phosphate, which has an olivine-type structure, may be used. Examples of the lithium composite oxide include lithium manganate ($LiMn_2O_4$); lithium cobaltate ($LiCoO_2$); lithium nickelate ($LiNiO_2$); compounds obtained by substituting at least a part of the manganese, cobalt, and nickel in these lithium compounds with another metal element such as aluminum, magnesium, titanium, and zinc; nickel-substituted lithium manganates obtained by substituting at least a part of the manganese in lithium manganate with nickel; cobalt-substituted lithium nickelates obtained by substituting at least a part of the nickel in lithium nickelate with cobalt; compounds obtained by substituting a part of the manganese in a nickel-substituted lithium manganate with another metal element (e.g., at least one of aluminum, magnesium, titanium, and zinc); and compounds obtained by substituting a part of the nickel in a cobalt-substituted lithium nickelate with another metal element (e.g., at least one of aluminum, magnesium, titanium, zinc, and manganese). One of these lithium composite oxides may be used singly, or two or more thereof may be used in a mixture.

The specific surface area (a BET specific surface area acquired in measurement at 77 K in accordance with a nitrogen adsorption method) of the positive electrode active material is preferably in the range of 0.01 to 10 $m^2/g$, and more preferably in the range of 0.1 to 3 $m^2/g$. A larger specific surface area requires a larger amount of a binder, which is disadvantageous in terms of the capacity density of an electrode, and a too small specific surface area may lower the ion conductivity between the electrolytic solution and the active material.

The average particle diameter of the positive electrode active material is, for example, preferably in the range of 0.1 to 50 μm, more preferably in the range of 1 to 30 μm, and even more preferably in the range of 5 to 25 μm in view of, for example, the reactivity to the electrolytic solution and rate characteristics. Here, an average particle diameter refers to a particle diameter at an integrated value up to 50% (median diameter: $D_{50}$) in a particle size distribution (volume-based) obtained by using a laser diffraction/scattering method.

The binder for a positive electrode is not limited, and the binders for a negative electrode can be used. Among them, polyvinylidene fluoride is preferred from the viewpoint of versatility and low cost. The content of the binder for a positive electrode is preferably in the range of 1 to 25 parts by mass, more preferably 2 to 20 parts by mass, and even more preferably 2 to 10 parts by mass based on 100 parts by mass of the positive electrode active material from the viewpoint of binding strength and energy density, which are in a trade-off relation. Further, examples of a binder other than polyvinylidene fluoride (PVdF) include vinylidene fluoride-hexafluoropropylene copolymers, vinylidene fluoride-tetrafluoroethylene copolymers, styrene-butadiene copolymer rubbers, polytetrafluoroethylene, polypropylene, polyethylene, polyimide, and polyamideimide.

The positive current collector is not limited, and aluminum, titanium, tantalum, stainless steel (SUS), another valve metal, or an alloy of them may be used from the viewpoint of electrochemical stability. Examples of the shape include a foil, a plate, and a mesh. In particular, an aluminum foil can be suitably used.

A conductive aid may be added to the positive electrode active material layer for the purpose of lowering the impedance. Examples of the conductive aid include carbonaceous fine particles such as graphite, carbon black, and acetylene black.

For the electrolyte, a non-aqueous electrolytic solution in which a lithium salt is dissolved in one or two or more non-aqueous solvents may be used. The non-aqueous solvent is not limited, and example thereof include cyclic carbonates such as ethylene carbonate (EC), propylene carbonate (PC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylates such as methyl formate, methyl acetate, and ethyl propionate; γ-lactones such as γ-butyrolactone; chain ethers such as 1,2-ethoxyethane (DEE) and ethoxymethoxyethane (EME); and cyclic ethers such as tetrahydrofuran and 2-methyltetrahydrofuran. Examples of other non-aqueous solvents which can be used include aprotic organic solvents such as dimethyl sulfoxide, 1,3-dioxolane, dioxolane derivatives, formamide, acetamide, dimethylformamide, acetonitrile, propionitrile, nitromethane, ethylmonoglyme, phosphate triesters, trimethoxymethane, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, and N-methylpyrrolidone.

The lithium salt to be dissolved in the non-aqueous solvent is not limited, and examples thereof include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, and lithium bis(oxalate)borate. One of these lithium salts may be used singly, or two or more thereof may be used in combination. Further, a polymer component may be contained as the non-aqueous electrolyte.

To form an SEI (Solid Electrolyte Interface) film with a high quality on the surface of the negative electrode and stably maintain it, an electrode protective film-forming agent, as an additive, may be added into the electrolytic solution. The SEI film has, for example, an effect of suppressing the reactivity (decomposition) of an electrolytic solution, and an effect of inhibiting the physical degradation of the structure of a negative electrode active material through promotion of desolvation in association with insertion and elimination of a lithium ion. Examples of the electrode protective film-forming agent for formation and maintenance of such an SEI film with a high quality include compounds having a sulfo group; fluorinated carbonates such as fluoroethylene carbonate; unsaturated cyclic carbonates such as vinylene carbonate; sultone compounds (cyclic monosulfonates) such as 1,3-propanesultone and 1,4-butanesultone; and cyclic disulfonate such as propylene methanedisulfonate. In the case that an electrode protective film-forming agent, as an additive, is contained in the electrolytic solution, the content of the additive in the electrolytic solution is preferably 0.005% by mass or more, more preferably 0.01% by mass or more, and even more preferably 0.1% by mass or more in view of obtaining a sufficient effect of addition, and the content is preferably 10% by mass or less, and more preferably 5% by mass or less in view of reducing, for example, increase of the viscosity or resistance of the electrolytic solution.

A separator may be provided between the positive electrode and the negative electrode. For the separator, a porous film made of a polyolefin such as polypropylene and polyethylene, a fluororesin such as polyvinylidene fluoride, or polyimide, woven fabric, nonwoven fabric, or the like may be used.

Examples of the shape of a battery include a cylinder, a rectangle, a coin type, a button type, and a laminate type. In the case of a laminate type, it is preferred to use a laminate film for an outer package to contain the positive electrode, the separator, the negative electrode, and the electrolyte. This laminate film includes a resin base material, a metal foil layer, and a heat-seal layer (sealant). Examples of the resin base material include polyester and nylon, and examples of the metal foil layer include an aluminum foil, an aluminum alloy foil, and a titanium foil. Examples of the material for the hot-seal layer include thermoplastic polymer materials such as polyethylene, polypropylene, and polyethylene terephthalate. Each of the resin base material layer and the metal foil layer is not limited to a single layer configuration, and may be in two or more layers. From the viewpoint of versatility and cost, an aluminum laminate film is preferred.

The positive electrode, the negative electrode, and the separator disposed therebetween are contained in an outer package container made of a laminate film, etc., and the electrolytic solution is injected therein, followed by sealing the outer package container. A structure in which an electrode group having a plurality of electrode pairs laminated is contained may be employed.

Figure 2:
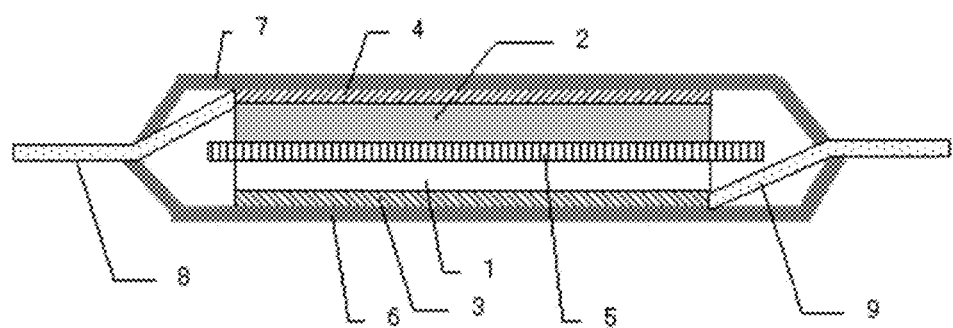
FIG. 2 is a cross-sectional view for illustrating an example of a lithium ion secondary battery according to an exemplary embodiment.

FIG. 2 illustrates a cross-sectional view of an example of the lithium ion secondary battery according to an exemplary embodiment (laminate type). As illustrated in FIG. 2, the lithium ion secondary battery of the present example includes: a positive electrode including a positive current collector 3 made of a metal such as an aluminum foil and a positive electrode active material layer 1 provided thereon and containing a positive electrode active material; and a negative electrode including a negative current collector 4 made of a metal such as a copper foil and a negative electrode active material layer 2 provided thereon and containing a negative electrode active material. The positive electrode and the negative electrode are laminated with a separator 5 made of a nonwoven fabric or a polypropylene microporous membrane interposed therebetween so that the positive electrode active material layer 1 and the negative electrode active material layer 2 are positioned on opposite surfaces of the separator 5. This electrode pair is contained in a container formed of outer packages 6, 7 made of an aluminum laminate film. The positive current collector 3 is connected to a positive electrode tab 9 and the negative current collector 4 is connected to a negative electrode tab 8, and these tabs are extracted through the container to the outside. An electrolytic solution is injected into the container, and the container is sealed. Alternatively, a structure in which an electrode group having a plurality of electrode pairs laminated is contained in a container may be used.

EXAMPLES

Example 1

A spheroidized natural graphite (average particle diameter ($D_{50}$): 15 μm) with a high roundness was provided as a negative electrode active material and a scale-shaped artificial graphite (average particle diameter ($D_{50}$): 10 μm) was provided as a fine graphite material. As a result of the above-described measurement method, it was confirmed that the average particle roundness of the natural graphite was 0.86 or higher and higher than the average particle roundness of the scale-shaped fine graphite material. In addition, it was confirmed by using a commercially available laser diffraction/scattering particle size analyzer that $D_{90}/D_{50}$ of the negative electrode active material (natural graphite) was 1.3 or smaller, and that $D_{90}/D_{50}$ of the fine graphite material (scale-shaped artificial graphite) was 1.65 or higher. A fine particle (carbon black) having an average particle diameter ($D_{50}$) of 100 nm or smaller was provided as a conductive aid.

The amount of the fine graphite material added was 2.0% by mass (mass ratio to conductive aid: approximately 6.7) based on the negative electrode active material. The amount of the conductive aid added was 0.3% by mass based on the negative electrode active material.

The fine graphite material (scale-shaped artificial graphite) and the conductive aid were mixed with the negative electrode active material (natural graphite) at the mass ratio shown in Table 1, and the mixture and a 1.0 wt % aqueous solution of carboxymethylcellulose (thickener) were mixed together to prepare a slurry. A styrene-butadiene copolymer (binder) was mixed therein. The ratio of the binder added to the negative electrode active material was 2.0% by mass. In Table 1, the quantities of the fine graphite material and conductive aid added are each in a mass ratio (% by mass) to the negative electrode active material.

This slurry was applied on one surface of a copper foil having a thickness of 10 μm, and the coating film was dried. Thereafter, the coating film (negative electrode coating film) was roll-pressed so that the density reached 1.5 g/cm$^3$ to obtain a negative electrode sheet having a size of 33×45 mm.

A mixed oxide (positive electrode active material) in which Li(Li$_{0.1}$Mn$_{1.9}$)O$_4$ and LiNi$_{0.85}$Co$_{0.15}$O$_2$ were mixed together at a mass ratio of 75:25 and polyvinylidene fluoride (binder) were dispersed in N-methyl-2-pyrrolidone to prepare a slurry. This slurry was applied on both surfaces of an aluminum foil, and the coating film was dried. Thereafter, the coating film (positive electrode coating film) was roll-pressed so that the density reached 3.0 g/cm$^3$ to obtain a positive electrode sheet having a size of 30×40 mm.

The negative electrode sheet was stacked on each surface of the positive electrode sheet with a separator made of a porous polyethylene film having a thickness of 25 μm interposed therebetween so that the positive electrode coating film and the negative electrode coating film were positioned on opposite surfaces of the separator. An extraction electrode for a positive electrode and an extraction electrode for a negative electrode were provided, and then the laminate was covered with a laminate film, into which an electrolytic solution was injected, and the resultant was sealed.

The electrolytic solution used was a solution obtained by dissolving a lithium salt (LiPF$_6$), as an electrolyte salt, in a mixture of ethylene carbonate (EC) and diethyl carbonate (DEC), as a solvent, at a volume ratio of 3:7 (EC:DEC) so that the concentration of the lithium salt reached 1.0 mol/L, and adding thereto a cyclic disulfonate (propylene methanedisulfonate), as an additive, so that the concentration reached 2.0% by mass.

The lithium ion secondary battery fabricated as described above was subjected to a charge/discharge cycle test (Cycle-Rate: 1C, temperature: 45° C., upper limit voltage: 4.2 V, lower limit voltage: 3.0 V), and the capacity retention rate after 400 cycles was determined. The result is shown in Table 1.

For a storage characteristics test, the battery fabricated was stored at SOC=100% and 60° C., and the increase rate in contact resistance after 8 weeks (contact resistance before the storage as a reference: 100%) was determined. The result is shown in Table 1. Here, SOC means a state of charge of a battery as represented by the following equation.

SOC=100×residual capacity (Ah)/full charge capacity (Ah)

Comparative Example 1

A lithium ion secondary battery was fabricated in the same manner as in Example 1 except that the fine graphite material was not added. The battery obtained was subjected to a charge/discharge cycle test and storage characteristics test under the same conditions as in Example 1. The result is shown in Table 1.

Example 2

A lithium ion secondary battery was fabricated in the same manner as in Example 1 except that LiNi$_{0.5}$Co$_{0.2}$Mn$_{0.3}$O$_4$ (NCM523) was used for the positive electrode active material. The battery obtained was subjected to a charge/discharge cycle test under the same conditions as in Example 1. The result is shown in Table 1.

Example 3

A lithium ion secondary battery was fabricated in the same manner as in Example 2 except that the amount of the fine graphite material to be added was changed to 1.0% by mass. The battery obtained was subjected to a charge/discharge cycle test under the same conditions as in Example 1. The result is shown in Table 1.

Comparative Example 2

A lithium ion secondary battery was fabricated in the same manner as in Example 2 except that the fine graphite material was not added. The battery obtained was subjected to a charge/discharge cycle test under the same conditions as in Example 1. The result is shown in Table 1.

Comparative Example 3

A lithium ion secondary battery was fabricated in the same manner as in Example 2 except that a fine graphite material having an average particle diameter (D$_{50}$) of 18 μm was used. The battery obtained was subjected to a charge/discharge cycle test under the same conditions as in Example 1. The result is shown in Table 1.

Comparative Example 4

A lithium ion secondary battery was fabricated in the same manner as in Example 2 except that the fine graphite material was not added, and the amount of the conductive aid to be added was increased to 2.3% by mass. When charging/discharging was performed for the battery obtained, the gas generation in the battery was large, and the capacity retention rate after the charge/discharge cycle test was not determined.

TABLE 1

| | Average diameter of fine graphite material (μm) | Amount of fine graphite material added (% by mass) | Amount of conductive aid added (% by mass) | Gas generation rate in initial charging (%) | Capacity retention rate after 400 cycles (%) | Increase rate in contact resistance after 8 weeks (%) |
|---|---|---|---|---|---|---|
| Example 1 | 10 | 2.0 | 0.3 | — | 77 | 116 |
| Comparative Example 1 | — | 0 | 0.3 | — | 72 | 137 |
| Example 2 | 10 | 2.0 | 0.3 | 300 | 85 | — |
| Example 3 | 10 | 1.0 | 0.3 | 200 | 85 | — |
| Comparative Example 2 | — | 0 | 0.3 | 100 | 80 | — |

TABLE 1-continued

|  | Average diameter of fine graphite material (μm) | Amount of fine graphite material added (% by mass) | Amount of conductive aid added (% by mass) | Gas generation rate in initial charging (%) | Capacity retention rate after 400 cycles (%) | Increase rate in contact resistance after 8 weeks (%) |
|---|---|---|---|---|---|---|
| Comparative Example 3 | 18 | 2.0 | 0.3 | — | 82 | — |
| Comparative Example 4 | — | 0 | 2.3 | 700 | (Large gas generation) | — |

As can be seen from Table 1, it clear from comparison between Example 1 and Comparative Example 1 that use of a specific negative electrode including a negative electrode active material, a fine graphite material, and a conductive aid provides improved cycle characteristics, and provides improved storage characteristics (the increase rate in contact resistance after 8 weeks can be reduced) over the case with no fine graphite material. Further, it is clear from comparison between Examples 2 and 3 and Comparative Example 2 that use of a specific negative electrode including a negative electrode active material, a fine graphite material, and a conductive aid provides improved cycle characteristics over the case with no fine graphite material. Furthermore, it is clear from comparison between Example 2 and Comparative Example 3 that a fine graphite material having a larger particle diameter has a lower cycle characteristics-improving effect.

In addition, it can be seen from Comparative Example 4 that increasing the amount of a conductive aid added, instead of adding a fine graphite material, causes a problem of a larger gas generation.

Although the sum total of the quantities of the fine graphite material and conductive aid added is identical between Example 2 and Comparative Example 4, the gas generation rate in initial charging in Example 2, in which a large amount of a fine graphite material is included, is reduced in comparison with Comparative Example 4, in which a fine graphite material is not included.

The gas generation rates in Table 1 are each in a relative value (%) to the gas generation in Comparative Example 2 as a reference (100%). The gas generation was determined by using the Archimedes' method.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

REFERENCE SIGNS LIST 1 positive electrode active material layer
2 negative electrode active material layer
3 positive electrode current collector
4 negative electrode current collector
5 separator
6 laminate outer package
7 laminate outer package
8 negative electrode tab
9 positive electrode tab
11 negative electrode active material particle
12 conductive aid particle
13 fine graphite particle

The invention claimed is:

1. A negative electrode for a lithium ion secondary battery, the negative electrode comprising a negative electrode active material, a fine graphite material, a conductive aid, and a binder,
    wherein a mass ratio of the fine graphite material to the conductive aid is in a range from 1 to 10, and
    an average particle diameter (median diameter $D_{50}$) of the fine graphite material is smaller than an average particle diameter (median diameter $D_{50}$) of the negative electrode active material, and in a range of 1 to 15 μm.

2. A negative electrode for a lithium ion secondary battery, the negative electrode comprising a negative electrode active material, a fine graphite material, a conductive aid, and a binder,
    wherein the fine graphite material includes a particle contacting with a particle of the negative electrode active material, or a particle contacting with a particle of the conductive aid contacting with a particle of the negative electrode active material, with an electroconductive path formed between particles of the negative electrode active material via the particle of the fine graphite material,
    a mass ratio of the fine graphite material to the conductive aid is in a range from 1 to 10, and
    an average particle diameter (median diameter $D_{50}$) of the fine graphite material is smaller than an average particle diameter (median diameter $D_{50}$) of the negative electrode active material, and in a range of 1 to 15 μm.

3. The negative electrode for a lithium ion secondary battery according to claim 1, wherein a ratio of the average particle diameter ($D_{50}$) of the fine graphite material, Db, to the average particle diameter ($D_{50}$) of the negative electrode active material, Da, Db/Da, is in a range of 0.2 to 0.7.

4. The negative electrode for a lithium ion secondary battery according to claim 1, wherein the average particle diameter ($D_{50}$) of the negative electrode active material is in a range of 10 to 30 μm.

5. The negative electrode for a lithium ion secondary battery according to claim 1, wherein a ratio of a particle diameter at 90 cumulative % in a cumulative distribution ($D_{90}$) to the average particle diameter ($D_{50}$), $D_{90}/D_{50}$, of the negative electrode active material is 1.5 or smaller.

6. The negative electrode for a lithium ion secondary battery according to claim 1, wherein a ratio of a particle diameter at 90 cumulative% in a cumulative distribution ($D_{90}$) to the average particle diameter ($D_{50}$), $D_{90}/D_{50}$, of the negative electrode active material is 1.3 or smaller.

7. The negative electrode for a lithium ion secondary battery according to claim 5, wherein a ratio of a particle diameter at 90 cumulative% in a cumulative distribution ($D_{90}$) to the average particle diameter ($D_{50}$), $D_{90}/D_{50}$, of the fine graphite material is larger than 1.5.

8. The negative electrode for a lithium ion secondary battery according to claim 5, wherein a ratio of a particle diameter at 90 cumulative % in a cumulative distribution ($D_{90}$) to the average particle diameter ($D_{50}$), $D_{90}/D_{50}$, of the fine graphite material is 1.65 or larger.

9. The negative electrode for a lithium ion secondary battery according to claim 1, wherein a specific surface area of the fine graphite material is 45 m²/g or smaller.

10. The negative electrode for a lithium ion secondary battery according to claim 1, wherein the fine graphite material comprises a scale-shaped particle.

11. The negative electrode for a lithium ion secondary battery according to claim 1, wherein the fine graphite material comprises artificial graphite.

12. The negative electrode for a lithium ion secondary battery according to claim 1, wherein a content of the fine graphite material based on the negative electrode active material is in a range of 0.1 to 6.0% by mass.

13. The negative electrode for a lithium ion secondary battery according to claim 1, wherein a content of the conductive aid based on the negative electrode active material is in a range of 0.1 to 3.0% by mass.

14. The negative electrode for a lithium ion secondary battery according to claim 1, wherein the conductive aid comprises an amorphous carbon particle having an average particle diameter ($D_{50}$) in a range of 10 to 100 nm, or a nanocarbon material.

15. The negative electrode for a lithium ion secondary battery according to claim 1, wherein the negative electrode active material comprises a spheroidized active material.

16. The negative electrode for a lithium ion secondary battery according to claim 15, wherein an average particle roundness of the negative electrode active material is in a range of 0.6 to 1.

17. The negative electrode for a lithium ion secondary battery according to claim 1, wherein the negative electrode active material comprises a graphite material.

18. The negative electrode for a lithium ion secondary battery according to claim 17, wherein the graphite material comprises natural graphite or natural graphite covered with amorphous carbon.

19. The negative electrode for a lithium ion secondary battery according to claim 1, wherein a content of the binder based on the negative electrode active material is in a range of 0.5 to 30% by mass.

20. A lithium ion secondary battery comprising a positive electrode, the negative electrode according to claim 1, and a non-aqueous electrolytic solution.

* * * * *